(12) United States Patent
Byun et al.

(10) Patent No.: US 8,877,369 B2
(45) Date of Patent: Nov. 4, 2014

(54) SECONDARY BATTERY HAVING CURRENT COLLECTORS WITH DEFORMABLE PORTIONS UNDERNEATH A VENT

(75) Inventors: Sangwon Byun, Suwon-si (KR); Hyoseob Kim, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 881 days.

(21) Appl. No.: 12/662,483

(22) Filed: Apr. 20, 2010

(65) Prior Publication Data
US 2010/0266879 A1 Oct. 21, 2010

(30) Foreign Application Priority Data
Apr. 21, 2009 (KR) .................. 10-2009-0034738

(51) Int. Cl.
H01M 10/04 (2006.01)
H01M 2/02 (2006.01)
H01M 2/06 (2006.01)
H01M 4/70 (2006.01)
H01M 2/12 (2006.01)

(52) U.S. Cl.
CPC ............ H01M 10/0431 (2013.01); Y02E 60/12 (2013.01); H01M 4/70 (2013.01); H01M 2/1235 (2013.01)
USPC .............................. 429/175; 429/149; 429/163

(58) Field of Classification Search
USPC .......................................... 429/149–163, 175
See application file for complete search history.

(56) References Cited

U.S. PATENT DOCUMENTS

| 2003/0044677 | A1* | 3/2003 | Naruoka ....................... 429/161 |
| 2006/0051667 | A1 | 3/2006 | Kim |
| 2008/0038627 | A1 | 2/2008 | Yamauchi et al. |

FOREIGN PATENT DOCUMENTS

| JP | 09-180698 A | 7/1997 |
| JP | 2005-032477 A | 2/2005 |
| JP | 2005-267945 A | 9/2005 |
| JP | 2008-066254 A | 3/2008 |
| KR | 10 2001-0048267 A | 6/2001 |
| KR | 10 2004-0099525 A | 12/2004 |
| KR | 10 2006-0011315 A | 2/2006 |

OTHER PUBLICATIONS

Notice of Allowance issued in corresponding Korean application, 10-2009-0034738, dated Mar. 16, 2011.

* cited by examiner

*Primary Examiner* — Patrick Ryan
*Assistant Examiner* — Steven Scully
(74) *Attorney, Agent, or Firm* — Lee & Morse, P.C.

(57) ABSTRACT

A secondary battery including a case having a lengthwise direction and including a space therein, an electrode assembly disposed in the space in the case, the electrode assembly including a rolled laminate of a positive electrode plate, a negative electrode plate and a separator interposed therebetween and having non-coating portions at ends thereof, a pair of current collectors, each current collector being electrically connected to one of the non-coating portions of the electrode assembly, each current collector including a current collector plate having an end portion, each end portion extending along the lengthwise direction of the case such that the end portions of the current collector plates of the pair of current collectors are spaced apart from each other in a central region in the lengthwise direction of the case, and a cap plate coupled to a top of the case to seal the case, the cap plate having a vent disposed therein at a position corresponding to the end portions of the current collector plates.

16 Claims, 4 Drawing Sheets

SECONDARY BATTERY HAVING CURRENT COLLECTORS WITH DEFORMABLE PORTIONS UNDERNEATH A VENT

BACKGROUND

1. Field

Embodiments relate to a secondary battery.

2. Description of the Related Art

Fossil fuel vehicles, e.g., gasoline-powered and diesel-powered vehicles, are major sources of air pollution. In recent years, environmentally friendly vehicles, e.g., electric vehicles and hybrid-electric vehicles, have attracted much attention as alternatives to conventional fossil fuel vehicles. Batteries may be used to drive motors of electric or hybrid vehicles. For this purpose, secondary batteries, which may be convenient and easy to charge, are currently used.

Secondary batteries may be capable of repeated charge/discharge cycles. Secondary batteries may be typically classified into two types, cylindrical and prismatic, depending on their shape. Prismatic batteries may be safer against overcharging than cylindrical batteries due to, e.g., more efficient heat dissipation. However, the high capacity required in a prismatic battery for a vehicle, e.g., a hybrid vehicle, may involve an increase in the size of the prismatic battery. Such an increase in size of the prismatic battery may result in an increase in the thickness of the prismatic battery, which may in turn cause a difference in heat dissipation between inner and outer portions of the prismatic battery. This difference in heat dissipation may make it difficult to dissipate heat from the battery. Therefore, the prismatic battery may become unsafe when overcharged. Thus, an improved structure of the prismatic battery may ensure safety.

SUMMARY

Embodiments are directed to a secondary battery, which substantially overcomes one or more of the drawbacks, limitations and/or disadvantages of the related art.

It is a feature of an embodiment to provide a secondary battery in which short circuits between electrodes may be induced to ensure safety when the battery is overcharged.

At least one of the above and other features and advantages may be realized by providing a secondary battery including a case having a lengthwise direction and including a space therein, an electrode assembly disposed in the space in the case, the electrode assembly including a rolled laminate of a positive electrode plate, a negative electrode plate and a separator interposed therebetween and having non-coating portions at ends thereof, a pair of current collectors, each current collector being electrically connected to one of the non-coating portions of the electrode assembly, each current collector including a current collector plate having an end portion, each end portion extending along the lengthwise direction of the case such that the end portions of the current collector plates of the pair of current collectors are spaced apart from each other in a central region in the lengthwise direction of the case, and a cap plate coupled to a top of the case to seal the case, the cap plate having a vent disposed therein at a position corresponding to the end portions of the current collector plates.

The end portions of the current collector plates may have a smaller width than other portions of the current collector plates.

The end portions of the current collector plates may have a smaller thickness than other portions of the current collector plates.

The spaced apart end portions of the current collector plates may lie in the same plane.

The end portion of one of the current collector plates may be positioned above the end portion of the other current collector plate such that the end portions of the current collector plates are vertically spaced apart from each other.

The vertical spacing of the end portions may be such that one end portion is positioned above the other end portion and wherein a lower surface of the end portion positioned above the other end portion is etched and an upper surface of the other end portion is etched.

The end portions may have a horizontal overlapping region.

The end portion of each current collector plate may have a partially etched lower surface such that the end portion may be configured to deform upwardly and contact the cap plate when the vent is opened.

Each of the current collector plates may further include an electrode terminal protruding upwardly through the cap plate.

The secondary battery may further include dielectric materials disposed between the electrode terminals and the cap plate to electrically insulate the electrode terminals from the cap plate.

The vent of the cap plate may be disposed above the end portions of the current collector plates.

The end portions of the current collector plates may be configured to contact the cap plate when vent is opened.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
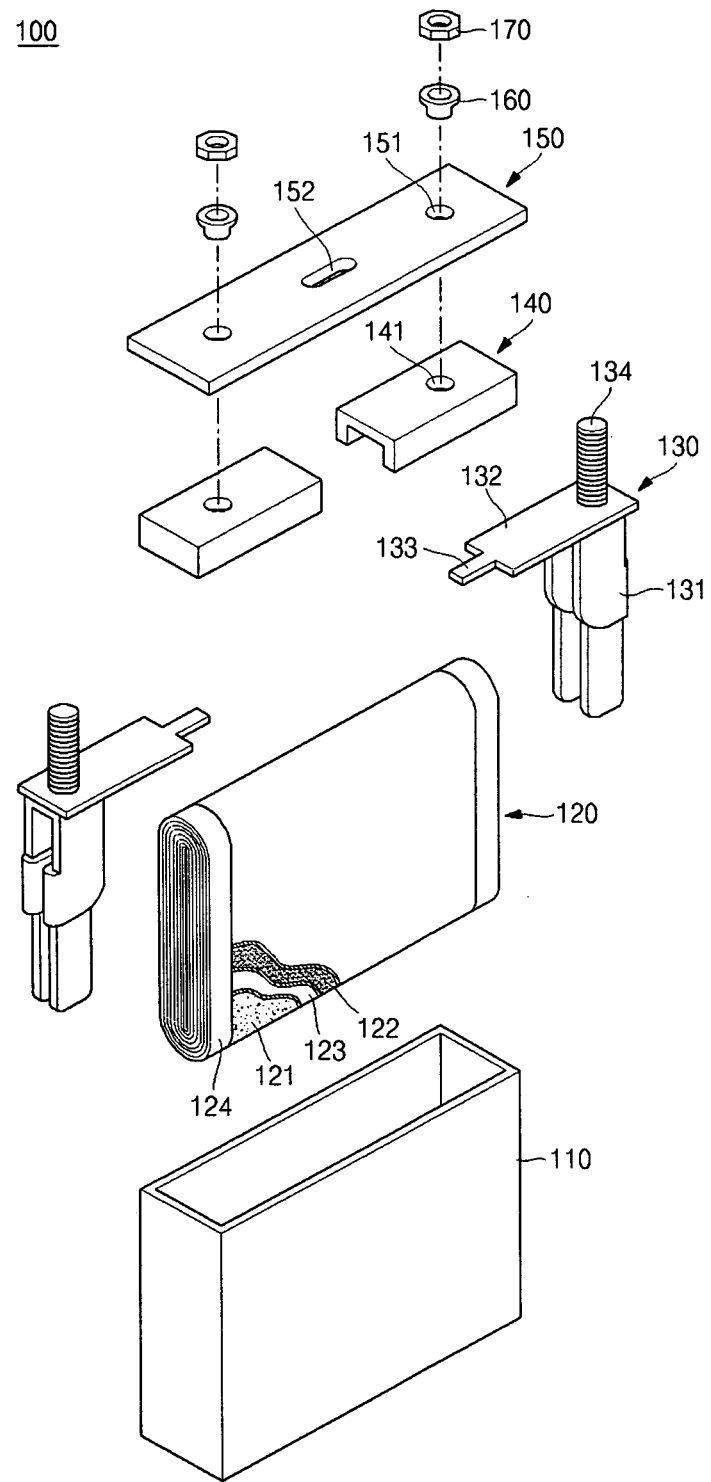
FIG. 1 illustrates an exploded perspective view of a secondary battery according to an embodiment.

Korean Patent Application No. 10-2009-0034738, filed on Apr. 21, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope of the invention to those skilled in the art.

In the drawing figures, the dimensions of layers and regions may be exaggerated for clarity of illustration. It will be understood that when a layer is referred to as being "under" another layer, it can be directly under, and one or more intervening layers may also be present. Similarly, terms such as "above," "below," "upper," "lower" and like terms are used in the relative and not absolute sense. Like reference numerals refer to like elements throughout.

Figure 2:
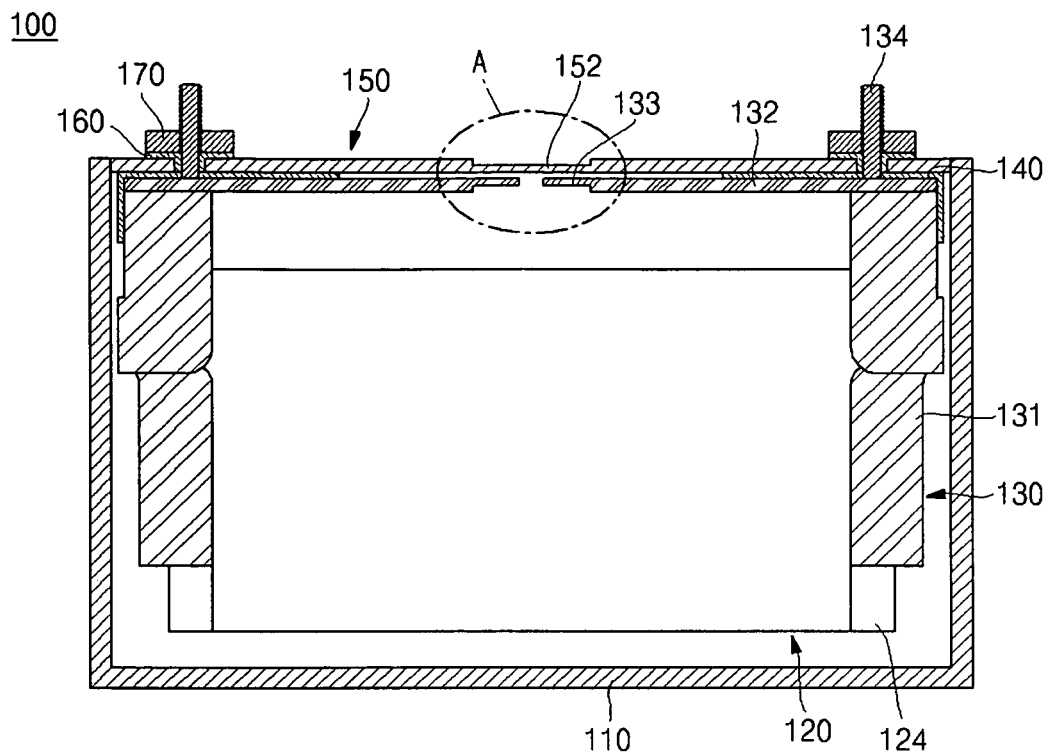
FIG. 2 illustrates a cross-sectional view of the secondary battery of FIG. 1.
Figure 3:
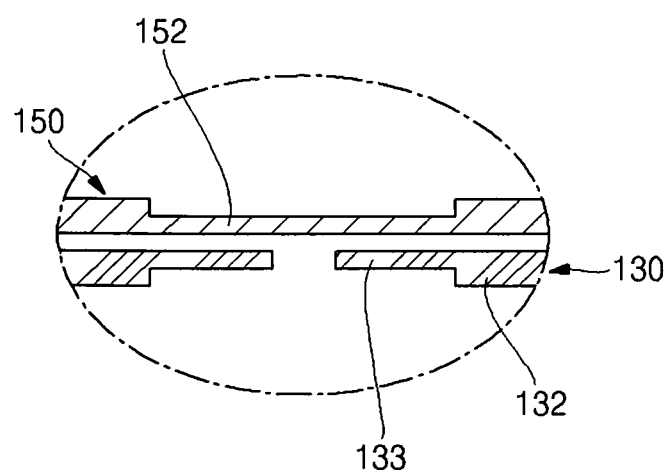
FIG. 3 illustrates an enlarged cross-sectional view of area A of FIG. 2.
Figure 4:
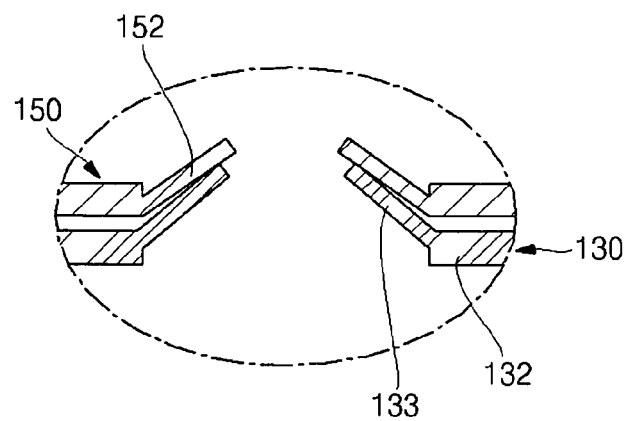
FIG. 4 illustrates a cross-sectional view of a configuration of the secondary battery of FIG. 1 when it is overcharged.

Hereinafter, a secondary battery 100 according to an embodiment will be explained. FIG. 1 illustrates an exploded perspective view of the secondary battery 100. FIG. 2 illustrates a cross-sectional view of the secondary battery 100. FIG. 3 illustrates an enlarged cross-sectional view of area A of FIG. 2. FIG. 4 illustrates a cross-sectional view of the configuration of the secondary battery 100 when overcharged.

Referring to FIGS. 1 through 4, the secondary battery 100 may include a case 110, an electrode assembly 120 accommodated in the case 110, a pair of current collectors 130 electrically connected to the electrode assembly 120, first dielectric materials 140 disposed on respective current collectors 130, a cap plate 150 coupled to upper surfaces of the first dielectric materials 140 and second dielectric materials 160 insulating the cap plate 150 from the current collectors 130. The secondary battery 100 may further include nuts 170 screwed onto the respective current collectors 130.

There is no particular restriction on the shape of the case 100. For example, the case 110 may have a hexahedral shape. The case 100 may have a space therein. The case 110 may be made of a conductive metal, e.g., aluminum, an aluminum alloy or nickel-plated steel.

The electrode assembly 120 may be disposed in the case 110. The electrode assembly 120 may include a positive electrode plate 121, a negative electrode plate 122 and a separator 123 interposed therebetween. The electrode assembly 120 may be manufactured by rolling a laminate of the positive electrode plate 121, the negative electrode plate 122 and the separator 123 in the form of a vortex (i.e., a "jelly-roll" shape). The electrode assembly 120 may have a pair of non-coating portions 124 at ends thereof. One of the non-coating portions 124 may be disposed at the end of the positive electrode plate 121; and the other non-coating portion 124 may be disposed at the negative electrode plate 122.

The current collectors 130 may be coupled to the electrode assembly 120. Specifically, the current collectors 130 may be coupled to respective non-coating portions 124 to allow the electrode assembly 120 to be electrically exposed to the outside of the secondary battery 100. Each of the current collectors 130 may include a current collector tab 131 connected to the non-coating portion 124, a current collector plate 132 connected to the current collector tab 131, a deformable portion 133 extending from the current collector plate 132 and an electrode terminal 134 protruding upwardly from the current collector plate 132.

The current collector tabs 131 may be coupled to respective non-coating portions 124. Each of the current collector tabs 131 may have a gap of a predetermined width. The non-coating portion 124 may be fitted into the gap of the corresponding current collector tab 131. The current collector tab 131 may be coupled to the corresponding non-coating portion 124 by, e.g., ultrasonic welding.

The current collector plates 132 may be connected to respective current collector tabs 131. When the secondary battery 100 is assembled, the current collector plates 132 may extend toward each other along a length of the case 110. It will be understood in this regard that the term "length" and "lengthwise" is used herein to indicate the relative disposition of the current collector plates of both embodiments and not necessarily to refer to the longest dimension of the case 110. The current collector plates 132 may lie in the same plane. The current collector plates 132 may be positioned along a lower surface of the cap plate 150 while remaining insulated from the cap plate 150.

The deformable portions 133 may be disposed at ends of the respective current collector plates 132. The deformable portions 133 may be connected to the respective current collector plates 132 and extend outwardly therefrom to face each other. The deformable portions 133 may extend from respective current collector plates 132 to a region below a center of the cap plate 150. The deformable portions 133 may be spaced a predetermined distance from each other. That is, the deformable portions 133 may be spaced apart from each other to prevent short circuits between the positive electrode plate 121 and the negative electrode plate 122 connected thereto during normal operation of the secondary battery 100.

The deformable portions 133 may be smaller in width and/or thickness than the current collector plates 132. Lower surfaces of the deformable portions 133 may be etched. When the secondary battery 100 is overcharged, thereby releasing gas, the deformable portions 133 may deform by being bent upwardly due to the pressure of the gas. That is, when the secondary battery 100 is overcharged, the deformable portions 133 may move upwardly to contact the cap plate 150. As a result, electrical shorting between the positive electrode plate 121 and the negative electrode plate 122 of the electrode assembly 120 may occur through the electrically conductive cap plate 150, the deformable portions 133 and the current collector tabs 131. This electrical shorting may beneficially prevent further charging of the electrode assembly 120 when the secondary battery 100 is overcharged.

The electrode terminals 134 may protrude upwardly from the respective current collector plates 132. Each electrode terminal 134 may be electrically connected to the positive electrode plate 121 or the negative electrode plate 122 through a corresponding current collector plate 132. In addition, each electrode terminal 134 may be exposed to the outside of the secondary battery 100 through the cap plate 150. Due to this configuration, the secondary battery 100 may be connected to an external device, which may enable easy charging and discharging.

The first dielectric materials 140 may be disposed on respective current collectors 130. Specifically, the first dielectric materials 140 may be disposed between the current collector plates 132 of the current collectors 130 and the cap plate 150, to ensure that the current collector plates 132 are electrically isolated from the cap plate 150. Each of the first dielectric materials 140 may have a terminal hole 141 therein through which the electrode terminal 134 of the current collector 130 may penetrate and protrude upwardly.

The cap plate 150 may be disposed on the case 110 to seal the case 110. That is, the cap plate 150 may be coupled to the case 110 to, e.g., prevent an electrolyte from leaking out of the case 110. The cap plate 150 may have terminal holes 151 disposed therein, through which the electrode terminals 134 of the current collectors 130 may penetrate and protrude upwardly.

The cap plate 150 may have a vent 152 disposed at a center thereof. When the voltage of the secondary battery 100 rises above an overcharge voltage, gas may be released from the case 110 and leak out through the vent 152. Since the vent 152 may be thinner than other portions of the cap plate 150, the vent 152 may be opened before the other portions of the cap plate 150 by an increase in internal pressure of the case 110 due to expansion of the gas. The gas may then be released from the case 110 through the opened vent 152, and, as a result, the secondary battery 110 may be protected from explosion.

When the vent 152 is opened by the released gas, the deformable portions 133 of the current collectors 130 may be bent and moved upwardly, as illustrated in FIG. 4. As a result, the deformable portions 133 of the current collectors 130 may move upwardly toward a hole left after the vent 152 is opened. When the deformable portions 133 move upwardly far enough, the current collectors 130 may contact and be electrically connected to the cap plate 150 to cause electrical shorting between the positive electrode plate 121 and the negative electrode plate 122 of the electrode assembly 120. In the present embodiment, when the deformable portions 133 contact the cap plate 150, further charging of the secondary battery 100 may be prevented to ensure safety after overcharge. Heat and gas generated during, e.g., short-circuiting of the electrodes, may be easily released through the opened hole of the vent 152.

The second dielectric materials 160 may be disposed between the cap plate 150 and the electrode terminals 134. The second dielectric materials 160 may electrically insulate the cap plate 150 from the electrode terminals 134. The second dielectric materials 160 may also cover portions of an upper surface of the cap plate 150 to prevent the nuts 170 from electrically contacting the cap plate 150 when the nuts 170 are screwed onto respective terminals 134 of the current collectors 130. The nuts 170 may be disposed on the second dielectric materials 160 and may be screwed onto respective electrode terminals 134 to fix the position of the current collectors 130 and the electrode assembly 120.

In the present embodiment, the deformable portions 133 of the current collector plates 130 may extend to a region underneath the vent 152 of the cap plate 150. Due to this structure, when the secondary battery 100 is overcharged, thereby releasing gas, the deformable portions 133 may contact the cap plate 150 to cause short circuits between the positive electrode plate 121 and the negative electrode plate 122 of the electrode assembly 120. Therefore, the secondary battery 100 may be protected from further charging to ensure safety after overcharge.

Figure 5:
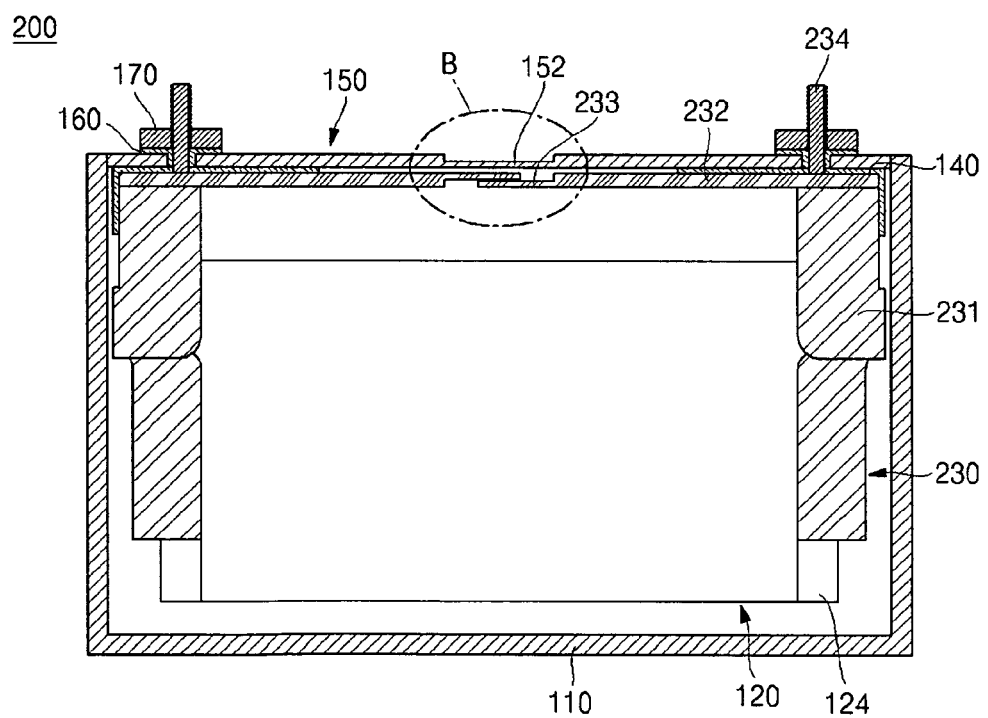
FIG. 5 illustrates a cross-sectional view of a secondary battery according to another embodiment.
Figure 6:
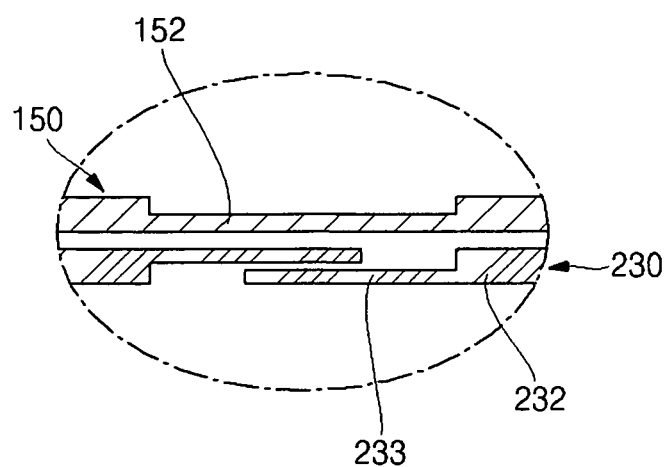
FIG. 6 illustrates an enlarged cross-sectional view of area B of FIG. 5.

Hereinafter, the configuration of a secondary battery 200 according to another embodiment will be explained. FIG. 5 illustrates a cross-sectional view of the secondary battery 200. FIG. 6 illustrates an enlarged cross-sectional view of area B of FIG. 5.

As illustrated in FIG. 5, the secondary battery 200 may include a case 110, an electrode assembly 120, current collectors 230 electrically connected to the electrode assembly 120, first dielectric materials 140, a cap plate 150 and second dielectric materials 160. The secondary battery 200 may further include nuts 170 screwed onto electrode terminals 234 of the current collectors 230.

The electrode assembly 120 may have non-coating portions at ends thereof. The current collectors 230 may be electrically coupled to respective non-coating portions 124. Each of the current collectors 230 may include a current collector tab 231 coupled to the non-coating portion 124, a current collector plate 232 connected to the current collector tab 231, a deformable portion 233 extending from the current collector plate 232 and the electrode terminal 234 protruding upwardly from the current collector plate 232. The current collector tabs 231, the current collector plates 232 and the electrode terminals 234 may perform the same functions as those of the secondary battery 100 according to the previous embodiment.

The deformable portion 233 may be disposed at an end of the corresponding current collector plate 232. The deformable portions 233 may be connected to the respective current collector plates 232. The deformable portions 233 may extend from the respective current collector plates 232 to a region below the center of the cap plate 150. When the secondary battery 200 is assembled, one of the deformable portions 233 may be positioned above the other deformable portion 233 such that the deformable portions 233 may be vertically spaced apart from each other. That is, the deformable portions 233 may extend below a center of a vent 152 of the cap plate 150; and one of the deformable portions 233 may be positioned above the other deformable portion 233. With this arrangement, short circuits between the deformable portions 233 may be avoided during normal operation of the secondary battery 200. A lower surface of the upper deformable portion 233 may be etched and an upper surface of the lower deformable portion 233 may be etched. This etching may allow the deformable portions 233 to horizontally overlap each other below the vent 152 and still be vertically spaced apart from each other, ensuring that during normal operation of the secondary battery 200, the deformable portions 233 may be electrically isolated from each other.

When the secondary battery 200 is overcharged, thereby releasing gas, the deformable portions 233 may be deformed by being bent upwardly due to the pressure of the gas. Specifically, when the secondary battery 200 is overcharged, the deformable portions 233 may be moved upwardly to contact the cap plate 150. This contact may cause short circuits between the positive electrode plate 121 and the negative electrode plate 122. An increase in the size of the overlapping region of the deformable portions 233 may increase a horizontal area of the deformable portions 233 to which the gas pressure may be applied. Such an increase in area may allow the deformation portions 233 to be deformed by the gas, thereby allowing the positive electrode plate 121 and the negative electrode plate 122 to easily short circuit. That is, the sensitivity of the deformable portions 233 to the gas released may be easily controlled by varying the size of the overlapping region of the deformable portions 233.

In the present embodiment, the deformable portions 233 of the current collectors 230 may extend underneath the vent 152. This arrangement may allow the deformable portions 233 to horizontally overlap each other and be vertically spaced apart from each other, so that the deformable portions 233 may be moved upwardly by the pressure of the gas released when the secondary battery is overcharged, thereby inducing short circuits between the electrodes.

As is apparent from the above description, the deformable portions of the current collector plates may extend in a lower region corresponding to the vent of the cap plate. Due to this structure, when the secondary battery of an embodiment is overcharged, thereby releasing gas, the deformable portions may be deformed and contact the cap plate, causing a short circuit between the positive and negative electrode plates of the electrode assembly. Therefore, the secondary battery may be protected from further charging, to ensure safety.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
a case having a lengthwise direction and including a space therein;
an electrode assembly disposed in the space in the case, the electrode assembly including a rolled laminate of a positive electrode plate, a negative electrode plate, and a separator interposed therebetween and having non-coating portions at ends thereof;

a pair of current collectors, each current collector being electrically connected to one of the non-coating portions of the electrode assembly, each current collector including a current collector plate having an end portion, each end portion extending along the lengthwise direction of the case such that the end portions of the current collector plates of the pair of current collectors are spaced apart from each other in a central region in the lengthwise direction of the case; and a cap plate coupled to a top of the case to seal the case, the cap plate having a vent disposed therein at a position corresponding to the end portions of the current collector plates, wherein the end portions of the current collector plates are disposed underneath the vent, the end portions of the current collector plates being spaced apart from the cap plate by a gap, a dimension of the gap being sufficiently small that the end portions of the current collector plates contact the cap plate when the vent is opened.

2. The secondary battery as claimed in claim 1, wherein the end portions of the current collector plates have a smaller width than other portions of the current collector plates.

3. The secondary battery as claimed in claim 1, wherein the end portions of the current collector plates have a smaller thickness than other portions of the current collector plates.

4. The secondary battery as claimed in claim 1, wherein the spaced apart end portions of the current collector plates lie in the same plane.

5. The secondary battery as claimed in claim 1, wherein the end portion of one of the current collector plates is positioned above the end portion of the other current collector plate such that the end portions of the current collector plates are vertically spaced apart from each other.

6. The secondary battery as claimed in claim 5, wherein:
the vertical spacing of the end portions is such that one end portion is positioned above the other end portion, and
a lower surface of the end portion positioned above the other end portion is etched and an upper surface of the other end portion is etched.

7. The secondary battery as claimed in claim 5, wherein the end portions have a horizontal overlapping region.

8. The secondary battery as claimed in claim 1, wherein the end portion of each current collector plate has a partially etched lower surface such that the end portion of each current collector plate is configured to deform upwardly and contact the cap plate when the vent is opened.

9. The secondary battery as claimed in claim 1, wherein each of the current collector plates further includes an electrode terminal protruding upwardly through the cap plate.

10. The secondary battery as claimed in claim 9, further comprising dielectric materials disposed between the electrode terminals and the cap plate to electrically insulate the electrode terminals from the cap plate.

11. The secondary battery as claimed in claim 3, wherein the vent of the cap plate is disposed above the end portions of the current collector plates, such that the vent of the cap plate overlaps the end portions of the current collector plates.

12. The secondary battery as claimed in claim 3, wherein a top or bottom surface of each of the current collector plates is substantially flat in the lengthwise direction.

13. The secondary battery as claimed in claim 4, wherein the spaced apart end portions of the current collector plates do not overlap each other along the lengthwise direction.

14. The secondary battery as claimed in claim 4, where the end portions of the current collector plates are substantially the same distance away from the vent of the cap plate.

15. The secondary battery as claimed in claim 1, wherein the non-coating portions of the electrode assembly extend along the lengthwise direction.

16. The secondary battery as claimed in claim 1, wherein:
each of the current collectors has a current collector tab that extends along a side of the electrode assembly that is substantially perpendicular to a top of the electrode assembly, and
each of the current collector plates extends along the top of the electrode assembly.

* * * * *